US012649434B2

(12) United States Patent
Kawamura et al.

(10) Patent No.: US 12,649,434 B2
(45) Date of Patent: Jun. 9, 2026

(54) ACTUATOR FOR AIRBAG DEVICE

(71) Applicant: TOYODA GOSEI CO., LTD., Kiyosu (JP)

(72) Inventors: Yusuke Kawamura, Kiyosu (JP); Yuji Sato, Kiyosu (JP); Koji Kawamura, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/821,018

(22) Filed: Aug. 30, 2024

(65) Prior Publication Data

US 2025/0100500 A1 Mar. 27, 2025

(30) Foreign Application Priority Data

Sep. 27, 2023 (JP) ................................. 2023-166494

(51) Int. Cl.
*B60R 21/239* (2006.01)
*B60R 21/203* (2006.01)
*B60R 21/2338* (2011.01)

(52) U.S. Cl.
CPC .......... *B60R 21/239* (2013.01); *B60R 21/203* (2013.01); *B60R 21/2338* (2013.01); *B60R 2021/2395* (2013.01)

(58) Field of Classification Search
CPC .... B60R 2021/161; B60R 2021/23384; B60R 2021/23388; B60R 2021/2395; B60R 21/203; B60R 21/2338; B60R 21/239
See application file for complete search history.

(56) References Cited

U.S. PATENT DOCUMENTS

| | | | | |
|---|---|---|---|---|
| 7,510,211 B2 * | 3/2009 | Clark | ...................... | F42B 3/103 |
| | | | | 280/741 |
| 8,015,906 B2 * | 9/2011 | Ito | ......................... | B60R 21/239 |
| | | | | 280/739 |
| 8,083,259 B2 * | 12/2011 | Schonhuber | ............ | B60R 21/26 |
| | | | | 280/741 |

(Continued)

FOREIGN PATENT DOCUMENTS

| | | | | |
|---|---|---|---|---|
| DE | 102015004000 A1 * | 10/2016 | | |
| DE | 102013000142 B4 * | 8/2020 | ......... | B60R 21/2338 |

(Continued)

*Primary Examiner* — Laura Freedman
(74) *Attorney, Agent, or Firm* — Posz Law Group, PLC

(57) ABSTRACT

An actuator is attached to a side of a housing portion and couples a coupling means extending from an airbag. The actuator includes a holding part that holds a squib, and a cap part disposed on the other end side of the holding part so as to face the squib. The holding part includes a cylindrical part that covers a proximal part side of the squib over an entire circumference. The cap part includes a ceiling part, and a peripheral wall part having a cylindrical shape extending from a peripheral edge of the ceiling part and covering an inner peripheral side of the cylindrical part. When the ceiling part receives the pressure of a combustion gas generated when the squib operates, the cap part moves the ceiling part while detaching the peripheral wall part from the cylindrical part, whereby the coupling to the coupling means can be released.

5 Claims, 13 Drawing Sheets

(56)                    References Cited

U.S. PATENT DOCUMENTS

| | | | | |
|---|---|---|---|---|
| 8,353,525 B2 * | 1/2013 | Parks | .................. | B60R 21/2338 |
| | | | | 280/743.2 |
| 8,517,419 B2 * | 8/2013 | Debler | ................ | B60R 21/2338 |
| | | | | 280/736 |
| 8,628,114 B1 * | 1/2014 | Quioc | ................ | B60R 21/2338 |
| | | | | 297/480 |
| 9,102,302 B2 * | 8/2015 | Muller | .................... | F42B 3/006 |
| 11,007,970 B2 * | 5/2021 | Hiraiwa | ................ | B60R 21/203 |
| 11,608,024 B2 * | 3/2023 | Tanaka | .................. | B60R 21/239 |
| 11,613,227 B2 * | 3/2023 | Horton | ................ | B60R 21/2338 |
| | | | | 280/743.2 |
| 11,865,997 B2 * | 1/2024 | Kawamura | ......... | B60R 21/2035 |
| 12,122,318 B2 * | 10/2024 | Kawamura | ......... | B60R 21/2338 |
| 2024/0092307 A1 | 3/2024 | Kawamura et al. | | |
| 2024/0239295 A1 * | 7/2024 | Freisler | .............. | B60R 21/2338 |
| 2024/0239296 A1 | 7/2024 | Kaiser et al. | | |

FOREIGN PATENT DOCUMENTS

| | | | |
|---|---|---|---|
| JP | 2023090502 A | 6/2023 |
| WO | 2022233477 A1 | 11/2022 |

* cited by examiner

REAR←→FRONT

FRONT

RIGHT ← → LEFT

REAR

LEFT

RIGHT

ACTUATOR FOR AIRBAG DEVICE

CROSS REFERENCE TO RERATED APPLICATION

The present application claims priority from Japanese Patent Application No. 2023-166494 of Kawamura et al., filed on Sep. 27, 2023, the entire disclosures of which are incorporated herein by reference.

BACKGROUND

1. Technical Field

The present disclosure relates to an actuator for an airbag device for controlling an inflated state of an airbag.

2. Description of Related Art

Conventionally, as an actuator in an airbag device, which is used to control an inflated state of an airbag, there has been disclosed an actuator in JP 2023-90502 A. In the conventional actuator, a cap part disposed to face a squib is attached to a holding part having a configuration in which the squib is held on one end side and the other end side is opened. In this actuator, the cap part has a flat ceiling part and two leg parts extending from the ceiling part. The cap part is attached to the other end side of the holding part by engaging locking convex parts provided on the tip sides of the leg parts with locking recess parts provided on the holding part side. In this actuator, a coupling member extending from the airbag is coupled by inserting the tip side of the coupling member through the region between the ceiling part of the cap part and the holding part. In the conventional actuator, the coupling to a coupling means is released by pressing the ceiling part with the pressure of a combustion gas generated when the squib operates to release the engaged state between the locking recess parts and the locking convex parts.

In the conventional actuator, however, a configuration is adopted in which the coupling member is coupled by inserting the coupling member through the portion between the ceiling part of the cap part and the holding part. That is, a gap for inserting the coupling member therethrough is formed between the ceiling part of the cap part and the tip of the holding part. Furthermore, a configuration is adopted in the conventional actuator, in which the cap part is coupled to the holding member using the two leg parts extending from the ceiling part. That is, the holding part is not configured to be closed by the cap part. Therefore, from the viewpoint of quickly pressing the ceiling part by the pressure of a combustion gas generated from the squib at the time of operation, there is room for improvement in improving airtightness in a state where the cap part is attached to the holding part (state of being mounted on a vehicle).

SUMMARY

An actuator for an airbag device of the present disclosure that is attached to a side of a housing portion housing a folded airbag, the actuator having a configuration in which an inflated state of the airbag can be controlled by coupling a coupling means extending from the airbag and by maintaining or releasing a coupled state to the coupling means, and the actuator including: a squib; a holding part that holds the squib on one end side; and a cap part that is disposed on the other end side of the holding part so as to face the squib, wherein the holding part includes a cylindrical part capable of covering a side on at least a proximal part side of the squib over an entire circumference, the cap part includes a ceiling part arranged to face the squib, and a peripheral wall part having a cylindrical shape extending from a peripheral edge of the ceiling part and arranged to cover an inner peripheral side or an outer peripheral side of the cylindrical part, is configured to close the other end side of the holding part, and is configured to be attached to the holding part by locking the peripheral wall part to the cylindrical part, and when attached to the holding part, an inserted state where the cylindrical part or the peripheral wall part is inserted into an insertion hole formed on a tip side of the coupling means can be maintained, and when the ceiling part receives a pressure of a combustion gas generated when the squib operates, coupling to the coupling means can be released by moving the ceiling part while detaching the peripheral wall part from the cylindrical part.

BRIEF DESCRIPTION OF THE DRAWINGS

FIG. 10A is a longitudinal sectional view of the cap part in the actuator of the embodiment, and FIG. 10B is a longitudinal sectional view of the holding part that holds a squib in the actuator of the embodiment;

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
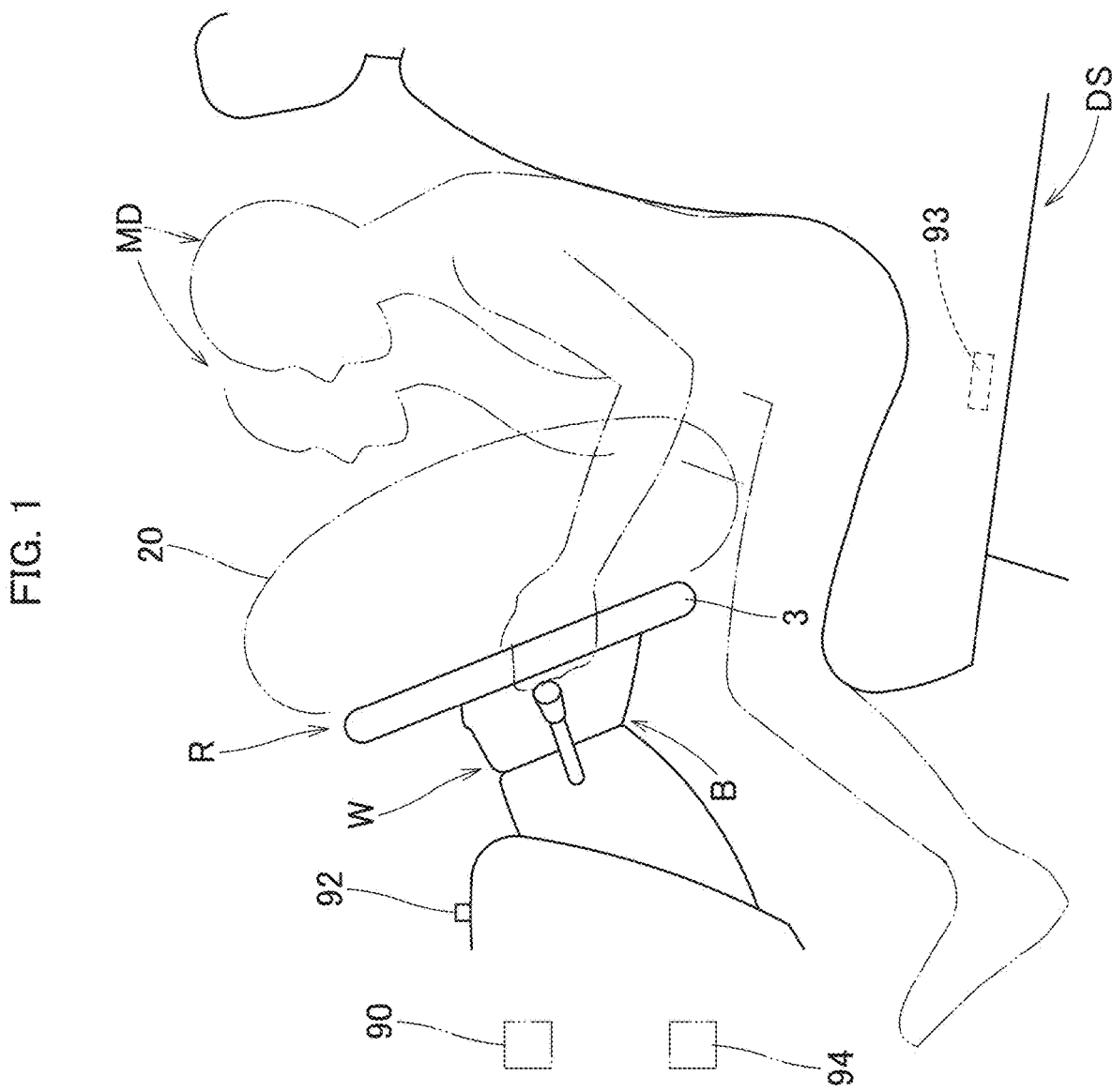
FIG. 1 is a schematic view illustrating an airbag device for a steering wheel using an actuator according to an embodiment of the present disclosure.
Figure 2:
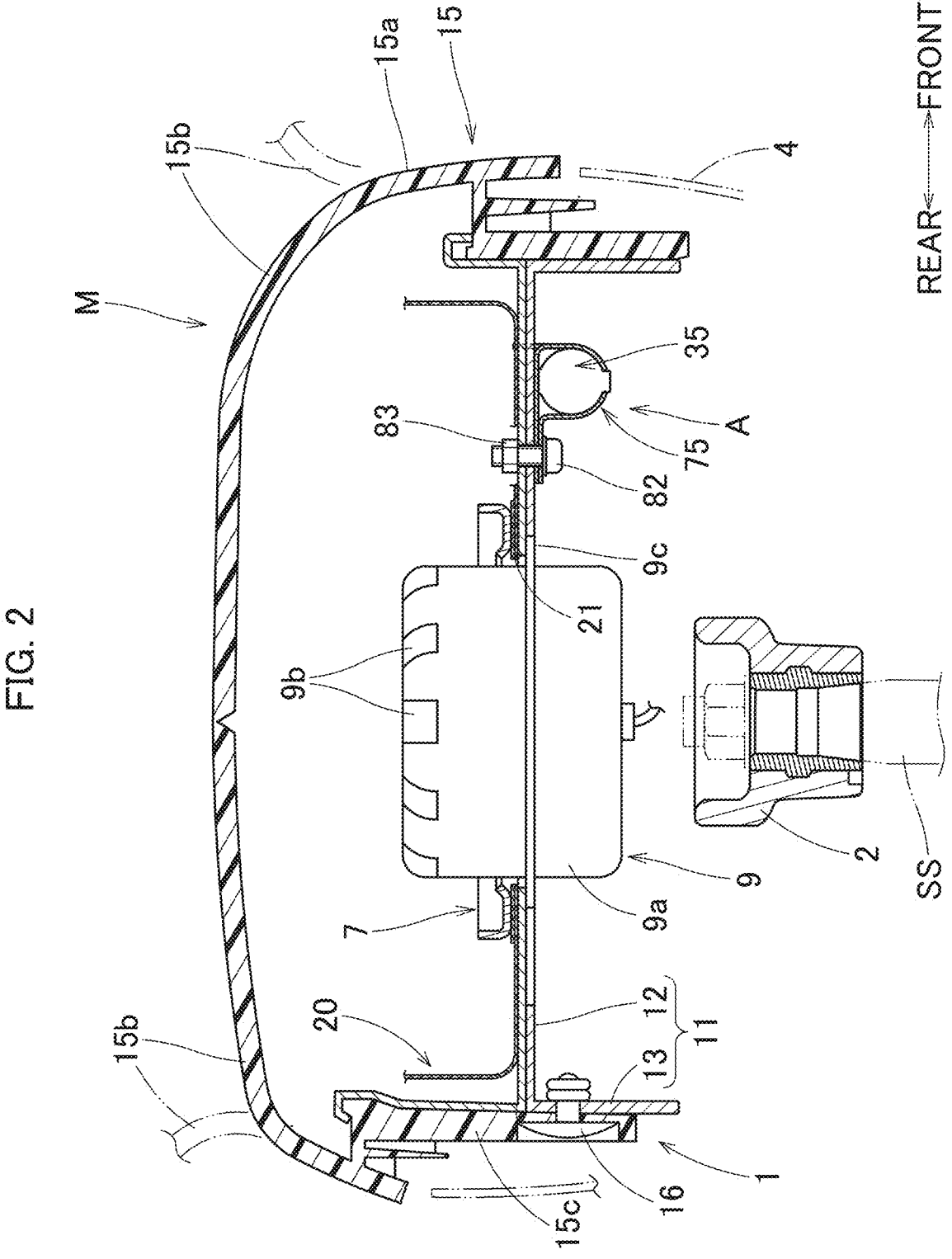
FIG. 2 is a longitudinal sectional view of the airbag device for a steering wheel in FIG. 1.

Hereinafter, an embodiment of the present disclosure will be described with reference to the drawings. In the embodiment, description will be made by taking an actuator A, which is used in an airbag device M mounted on a steering wheel W, as an example. As illustrated in FIGS. 1 and 2, the steering wheel W includes a steering wheel main body 1 and the airbag device M arranged above a boss part B at the center of the steering wheel main body 1. In the embodiment, the steering wheel main body 1 includes a ring part R to be gripped at the time of steering, the boss part B arranged substantially at the center of the ring part R and coupled to a steering shaft SS, and a predetermined number of spokes (not illustrated) coupling the boss part B and the ring part R.

In the embodiment, the front-rear, up-down, and left-right directions are based on when the steering wheel W mounted on a vehicle is steered straight ahead unless otherwise stated. Specifically, the up-down along the axial direction of the steering shaft SS (see FIG. 2) to which the steering wheel W is assembled is defined as the up-down direction; the front-rear of the vehicle, which is a direction orthogonal to the axis of the steering shaft SS, is defined as the front-rear direction; and the left-right of the vehicle, which is a direction orthogonal to the axis of the steering shaft SS, is defined as the left-right direction, thus indicating the front-rear, up-down, and left-right directions.

As illustrated in FIGS. 1 and 2, the steering wheel main body 1 includes a core metal 2 made of metal such as an aluminum alloy, a covering layer 3 made of synthetic resin, and a lower cover 4 covering a lower portion of the boss part B and made of synthetic resin. The core metal 2 is arranged to couple the respective parts of the ring part R and the boss part B. The covering layer 3 covers the core metal 2 at the portions of the ring part R and the spokes (not illustrated).

As illustrated in FIG. 2, the airbag device M includes: an airbag 20; an inflator 9 that supplies an inflation gas to the airbag 20; a case 11 as a housing portion that houses and holds the airbag 20 folded and the inflator 9; an airbag cover 15 covering the airbag 20 folded; and a retainer 7 for attaching the airbag 20 and the inflator 9 to the case 11.

As illustrated in FIG. 2, the inflator 9 includes a substantially cylindrical main body 9a having a plurality of gas outlets 9b, and a flange 9c for attaching the inflator 9 to the case 11. A through hole (not illustrated) for allowing each bolt 7a of the retainer 7 to pass therethrough is formed in the flange 9c. The inflator 9 is electrically connected to a control device 90 to be described later.

In the embodiment, the inflator 9 of the airbag device M and a squib 37 of the actuator A to be described later are configured to be controlled in operation by the control device 90 illustrated in FIG. 1.

As illustrated in FIG. 1, the control device 90 is electrically connected to occupant detection sensors capable of detecting the physique, the seated position, and the like of a driver MD as an occupant seated in a driver's seat DS (e.g., a position detection sensor 92 capable of detecting the distance between the steering wheel W and the driver MD and a weight detection sensor 93 capable of detecting the weight of the driver MD). The control device 90 is also electrically connected to a collision detection sensor 94 capable of detecting an acceleration or a direction of acceleration of the vehicle. The control device 90 operates the inflator 9 of the airbag device M and operates the squib 37 of the actuator A by causing electric signals from the position detection sensor 92, the weight detection sensor 93, or the collision detection sensor 94 to be input. In the embodiment, the squib 37 of the actuator A is controlled in its operation by the control device 90, so that an increase in the internal pressure of the airbag 20 can be controlled when the airbag 20 inflates at the time of operation of the inflator 9. Specifically, the squib 37 of the actuator A is controlled in its operation such that the airbag 20 is caused to inflate in a suitable inflation mode by exhausting the inflation gas having flowed into the airbag 20 out of the airbag 20.

As illustrated in FIG. 2, the case 11 as the housing portion, which is made of sheet metal, includes a bottom wall part 12 having a substantially rectangular plate shape to which the inflator 9 inserted from below is attached, and a peripheral wall part 13 extending vertically from an outer peripheral edge of the bottom wall part 12. In the bottom wall part 12, an insertion hole 12a, an attachment hole 12b, and a through hole 12c are formed in a region on the front side of an opening (its illustration and reference sign are omitted) for inserting the main body 9a of the inflator 9 therethrough (see FIGS. 3, 5, 6B, 8, and 9). The insertion hole 12a is a portion for inserting a coupling string part 27 as a coupling means to be described later therethrough, the coupling string part 27 extending from the airbag 20. The attachment hole 12b is a portion for attaching an attachment bracket 75 to be described later of the actuator A. The through hole 12c is a portion for allowing a protruding piece 79 formed on the attachment bracket 75 to pass through. An attachment piece (not illustrated) extending outward is formed on the upper end side of the peripheral wall part 13. In the embodiment, the airbag device M is configured to be mounted on the upper portion of the boss part B of the steering wheel main body 1 having been installed on the steering shaft Ss by attaching and fixing the case 11 to the core metal 2 of the steering wheel W using an attachment board of a horn switch mechanism attached to this attachment piece (not illustrated). A side wall part 15c of the airbag cover 15 is attached to the peripheral wall part 13 of the case 11 using a rivet 16 or the like (see FIG. 2). In the embodiment, the airbag 20 and the inflator 9 are attached to the bottom wall part 12 of the case 11 using the bolts 7a (see FIG. 3) of the retainer 7 arranged in the airbag 20 as an attachment means. Although not illustrated in detail, each of the bolts 7a is caused to pass through a peripheral edge of an inflow opening 21 to be described later of the airbag 20, the bottom wall part 12 of the case 11, and the flange 9c of the inflator 9, and is secured with a nut 8.

The airbag cover 15 made of synthetic resin includes a ceiling wall part 15a covering the upper side of the airbag 20 housed in the case 11, and a side wall part 15c having a substantially quadrangular cylindrical shape extending downward from the vicinity of the outer peripheral edge of the ceiling wall part 15a (see FIG. 2). Two door parts 15b and 15b, which are opened forward and rearward when pressed by the inflating airbag 20, are formed in the ceiling wall part 15a.

Figure 4A:
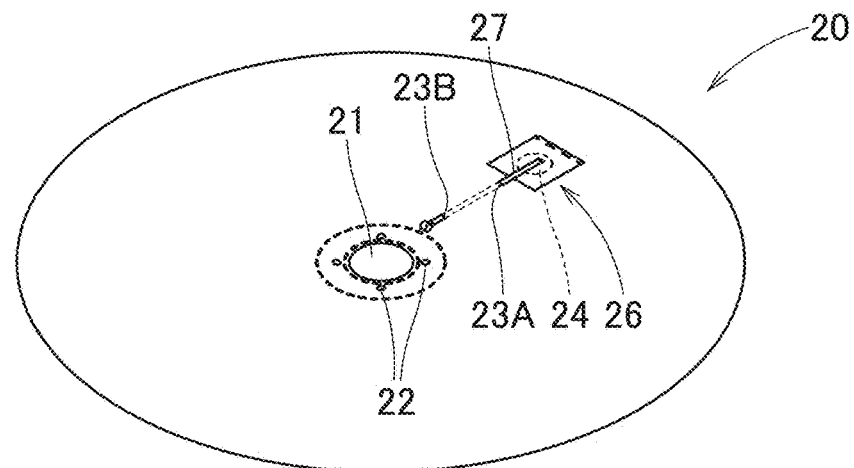
FIG. 4A is a schematic view illustrating an airbag used in the airbag device.

The airbag 20 has a bag shape made of a flexible woven fabric made of polyamide yarns, polyester yarns, or the like. As indicated by the chain double-dashed line in FIG. 1, the airbag 20 inflates to cover the upper surface of the steering wheel W with the inflation gas caused to flow into the airbag. As illustrated in FIG. 4A, the airbag 20 has the inflow opening 21. The inflow opening 21 is for inserting the main body 9a of the inflator 9 from below. Four attachment holes 22 for inserting the bolts 7a of the retainer 7 therethrough are formed at the peripheral edge of the inflow opening 21. In the airbag 20, an exhaust hole 24 opened in a circular shape is formed in front of the inflow opening 21. Between the exhaust hole 24 and the inflow opening 21, insertion holes 23A and 23B are formed at two locations near the rear edge of the exhaust hole 24 and near the front edge of the inflow opening 21 (see FIG. 4A). Each of the insertion holes 23A and 23B is for inserting the coupling string part 27 as the coupling means therethrough. Each of the insertion holes 23A and 23B is formed in a slit shape extending substantially along the left-right direction so that the coupling string part 27 can be inserted therethrough.

On the outer peripheral side of the airbag 20, a flap 26 is disposed to close the exhaust hole 24. Similarly to the airbag 20, the flap 26 is formed of a flexible woven fabric made of polyester yarns, polyamide yarns, or the like. The outer shape of the flap 26 is designed to be a substantially rectangular shape capable of closing the exhaust hole 24, and the one side being on a side away from the inflow opening 21 (side on the front side), is coupled to the front edge side of the exhaust hole 24. In the flap 26, to a side (side on the rear side) on the inflow opening 21 side facing the side described above, a proximal part 27a of the coupling string part 27 as the coupling means to be coupled to an actuator main body 35 to be described later is coupled. The coupling string part 27 as the coupling means is formed of narrow, flexible strips. The coupling string part 27 is arranged substantially along the front-rear direction in a state where the airbag 20 is spread flat. A loop part 28, which enables a peripheral wall part 58 (specifically, a proximal part side portion 59) of a cap part 55 to be described later of the actuator main body 35 to be inserted, is formed on the tip 27b side of the coupling string part 27. That is, in the embodiment, the loop part 28 constitutes an insertion hole that enables the proximal part side portion 59 of the cap part 55 to be inserted. The outer shape (inner diameter dimension) of the loop part 28 is set to a dimension that enables the proximal part side portion 59 of the cap part 55 to be inserted and disables a ceiling part 56 to be described later of the cap part 55 to be inserted. The length dimension of the coupling string part 27 is set to a dimension that enables the airbag 20 to inflate without any trouble even in a state where the coupled state of the tip 27b side to the actuator main body 35 is maintained. The coupling string part 27 is inserted through the insertion holes 23A and 23B formed in the airbag 20 in a state where the outer peripheral side of the exhaust hole 24 is covered with the flap 26. The proximal part 27a side and the tip 27b side of the coupling string part 27 are arranged on the outer peripheral side of the airbag 20. The intermediate portion of the coupling string part 27 is arranged on the inner peripheral side of the airbag 20. In a state where this state is maintained, the coupling string part 27 is folded together with the airbag 20 and housed in the case 11. The tip 27b of the coupling string part 27 is protruded from the insertion hole 12a of the case 11 when mounted on the vehicle. By inserting the peripheral wall part 58 (proximal part side portion 59) of the cap part 55 of the actuator main body 35 through the loop part 28 provided at the tip 27b, the coupling string part 27 is coupled to the actuator main body 35 (see FIGS. 5 to 7, and A in FIG. 8).

Figure 4B:
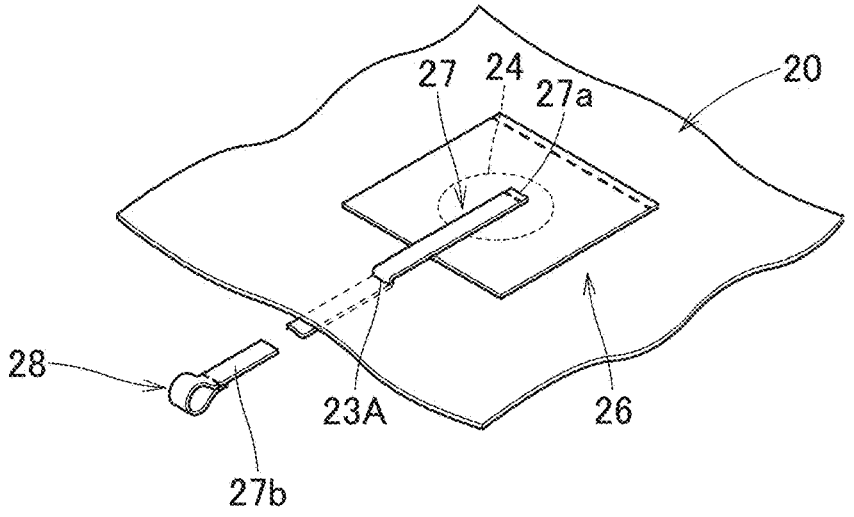
FIGS. 4B and 4C are schematic views illustrating a region around an exhaust hole in the airbag.
Figure 4C:
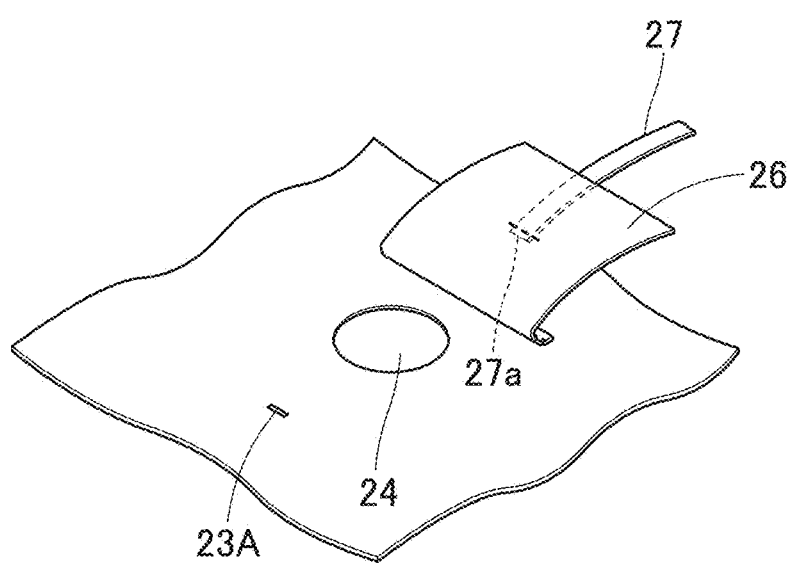
Figure 13A:
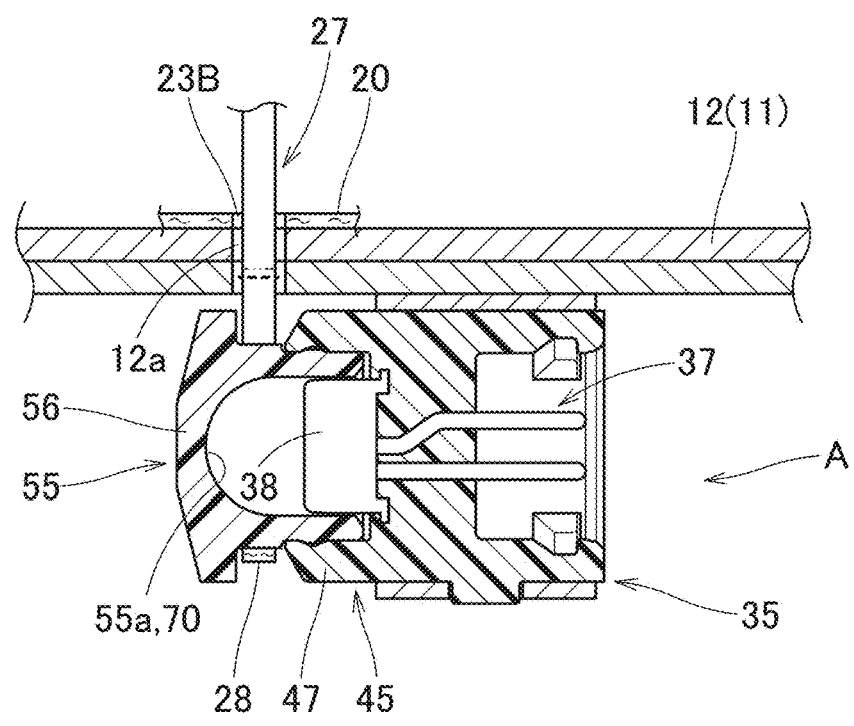
FIGS. 13A and 13B are longitudinal sectional views illustrating the actuator of the embodiment before and after operation.

In the embodiment, the airbag 20 inflates in two inflation modes, including an opening mode in which the exhaust hole 24 is opened and a closing mode in which the exhaust hole 24 is kept closed. Specifically, in a state where the actuator main body 35 does not operate and the coupling between the tip 27b of the coupling string part 27 and the actuator main body 35 is maintained (a state where the inserted state of the proximal part side portion 59 of the cap part 55 into the loop part 28 is maintained, see FIG. 13A), the tip side of the flap 26 is pressed by the proximal part 27a of the coupling string part 27. Then, the airbag 20 inflates in the closing mode in which the flap 26 closes the exhaust hole 24, as illustrated in FIG. 4B. In a state where: the actuator main body 35 operates; the cap part 55 is detached from a holding part 45 to be described later constituting the actuator main body 35; the peripheral wall part 58 of the cap part 55 comes off the loop part 28; and the coupling between the coupling string part 27 and the actuator main body 35 is released (see FIG. 13B), the flap 26 is pressed by the inflation gas flowing out of the exhaust hole 24 and the flap 26 is opened. Then, the airbag 20 inflates in the opening mode in which the exhaust hole 24 is opened, as illustrated in FIG. 4C. The airbag 20 completes its inflation in a state where the internal pressure is maintained in the closing mode. The airbag 20 completes its inflation in a state where an increase in the internal pressure is suppressed in the opening mode. The operation of the actuator main body 35 is due to the control by the control device 90. In the embodiment, when the control device 90 detects excessive approach of the driver MD to the steering wheel W by a signal from the position detection sensor 92 or detects that the driver MD is small in size by a signal from the weight detection sensor 93, the actuator main body 35 is operated so as to reduce the internal pressure of the airbag 20 at the time of inflation, simultaneously with or with a slight delay from the operation of the inflator 9.

Figure 3:
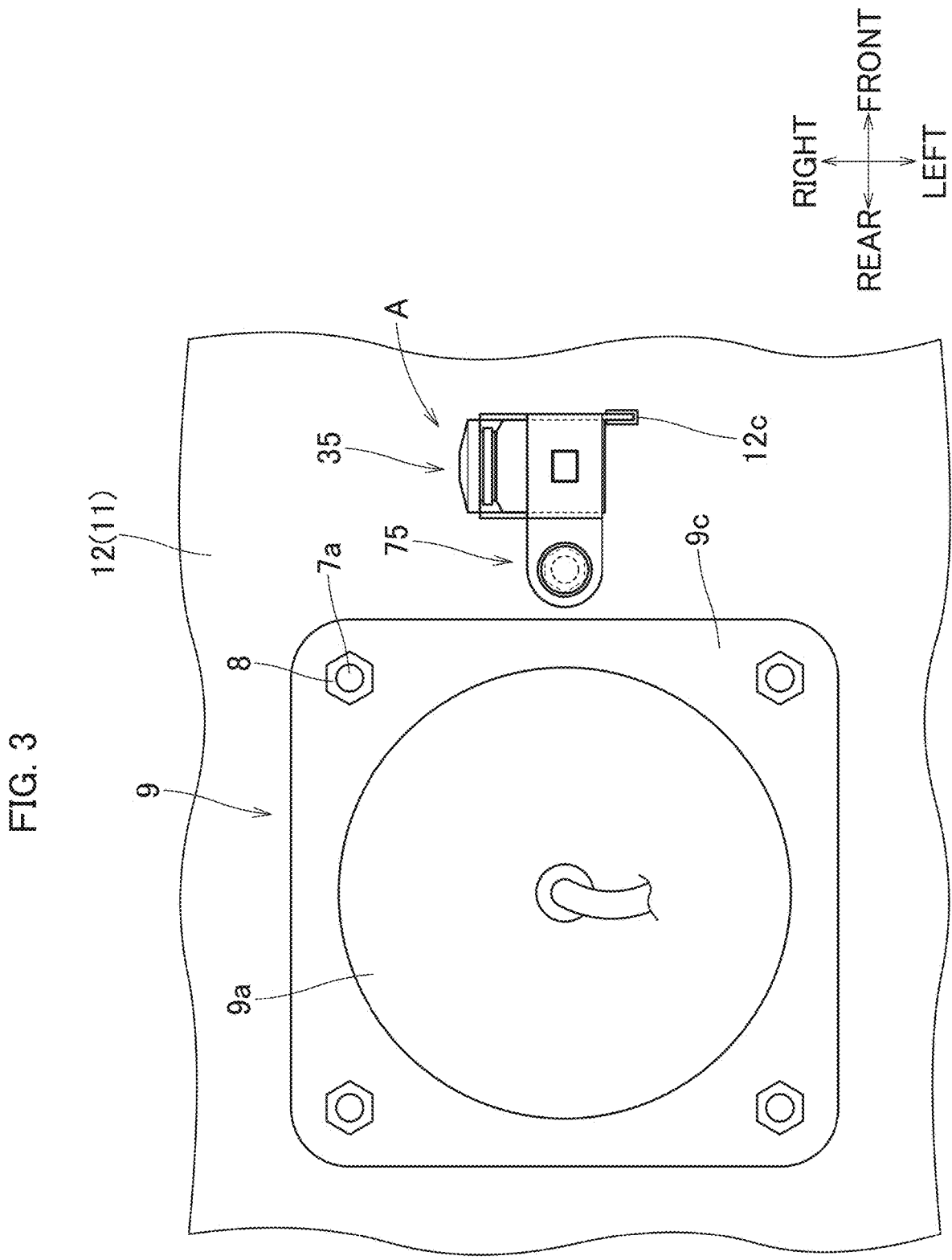
FIG. 3 is a partially enlarged bottom view illustrating an inflator and the actuator of the embodiment in the airbag device for a steering wheel in FIG. 1.
Figure 5:
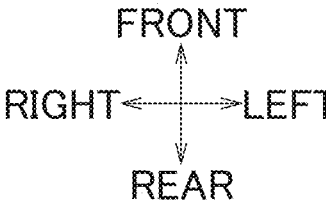
FIG. 5 is a partially enlarged bottom view illustrating the actuator in FIG. 3.
Figure 6A:
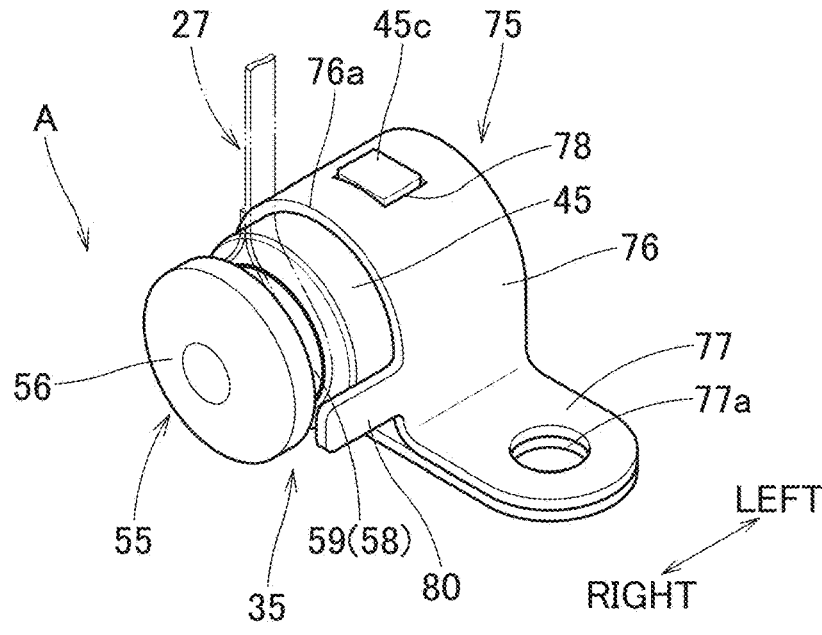
FIG. 6A is a schematic perspective view of the actuator of the embodiment as viewed from a side of a cap part.
Figure 6B:
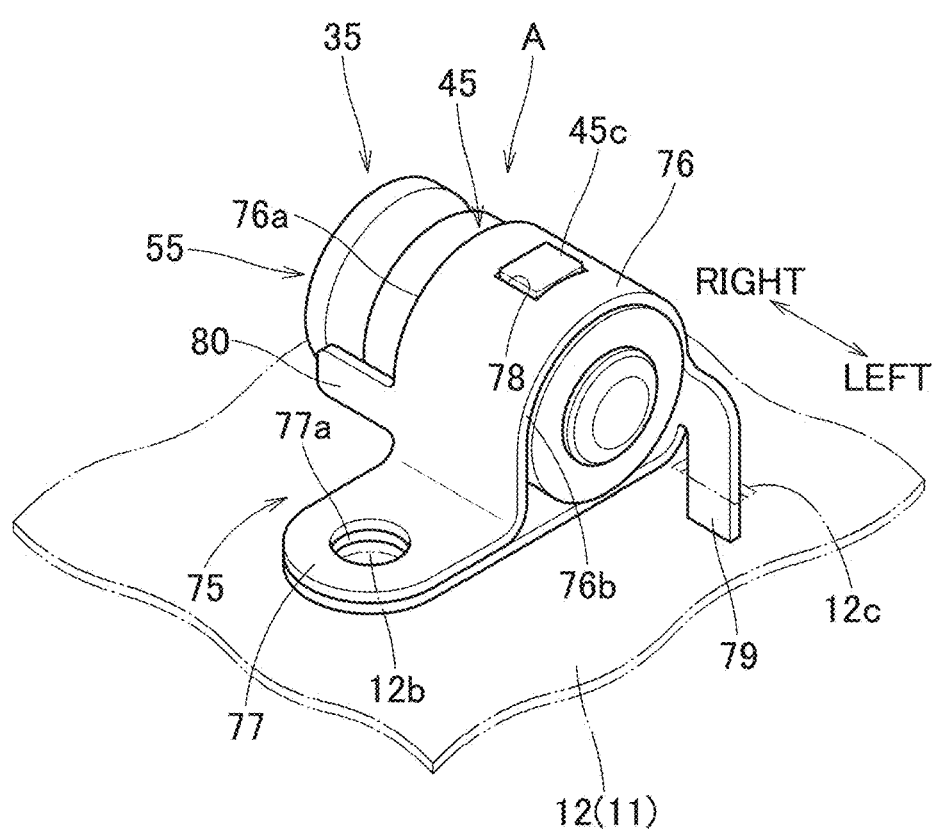
FIG. 6B is a schematic perspective view of the actuator of the embodiment as viewed from a side of a holding part.

In the embodiment, the actuator A is arranged in a region on the front side of the inflator 9, as illustrated in FIGS. 2 and 3. As illustrated in FIGS. 5, 6A, and 6B, the actuator A includes the actuator main body 35 and the attachment bracket 75 for attaching the actuator main body 35 to the case 11 as the housing portion.

Figure 8:
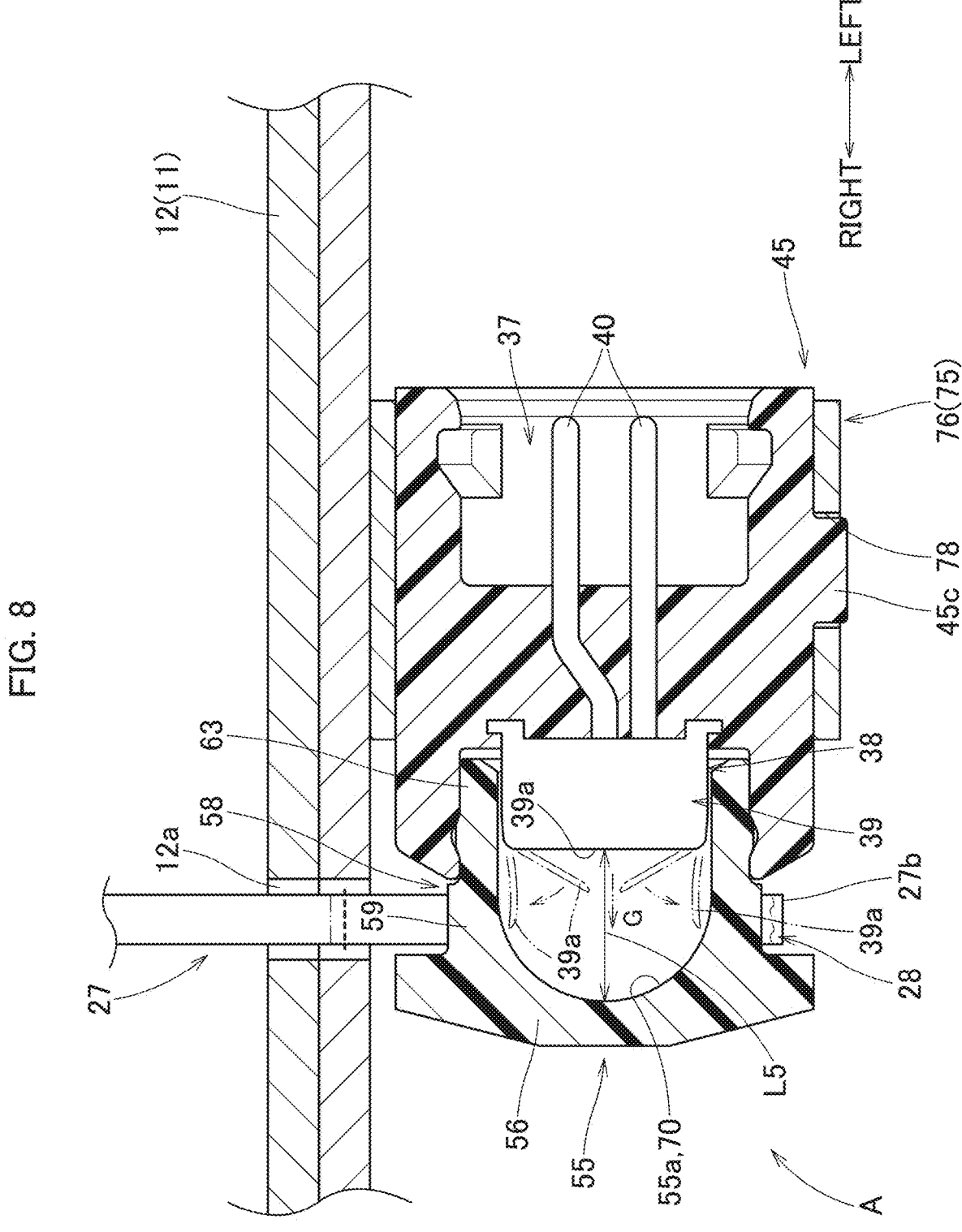
FIG. 8 is a longitudinal sectional view of the actuator of the embodiment, taken along the left-right direction.

As illustrated in FIGS. 6A and 6B, the actuator main body 35 is s designed such that its outer shape is substantially cylindrical. In the embodiment, the actuator main body 35 is attached to the case 11 using the attachment bracket 75, so that the axial direction is substantially aligned with the left-right direction. As illustrated in FIG. 8, the actuator main body 35 includes the holding part 45, the squib 37 held on the proximal part side (in the embodiment, on a left end 45b side) that is on one end side of the holding part 45, and the cap part 55 disposed on the other end side (which is on the tip side, i.e., on a right end 45a side in the embodiment) of the holding part 45 so as to face the squib 37. The holding part 45 and the cap part 55 are made of synthetic resin made of polyamide resin or the like mixed with a reinforcing filler.

As illustrated in FIG. 8, the squib 37 includes a main body 38 and a pair of conductive pins 40 and 40 extending leftward from the main body 38. The conductive pin 40 is arranged to expose the tip side from the left surface side of a base 46 to be described later of the holding part 45. The conductive pin 40 is a portion to which a connector (not illustrated) electrically connected to the control device 90 is connected. Although not illustrated in detail, the main body 38 houses therein a gas generating agent capable of generating a combustion gas. In the main body 38, the outer peripheral side of the gas generating agent is covered with a thin metal cover 39 made of an aluminum alloy or the like. The main body 38 operates to burn the gas generating agent when an operation signal from the control device 90 is input. At this time, the cover 39 covering the outer peripheral side of the gas generating agent opens a region (which is a region on a right end surface 38a side of the main body 38 and a region of a disk-shaped top plate part 39a) covering the cap part 55 side of the gas s generating agent. Specifically, the region of the top plate part 39a is radially opened by being broken with the vicinity of the center as a starting point and by being divided into a plurality of parts (see the chain double-dashed line in FIG. 8). The squib 37 is molded integrally with the holding part 45 by being insert-molded at the time of forming the holding part 45, and is held by the holding part 45.

Figure 7:
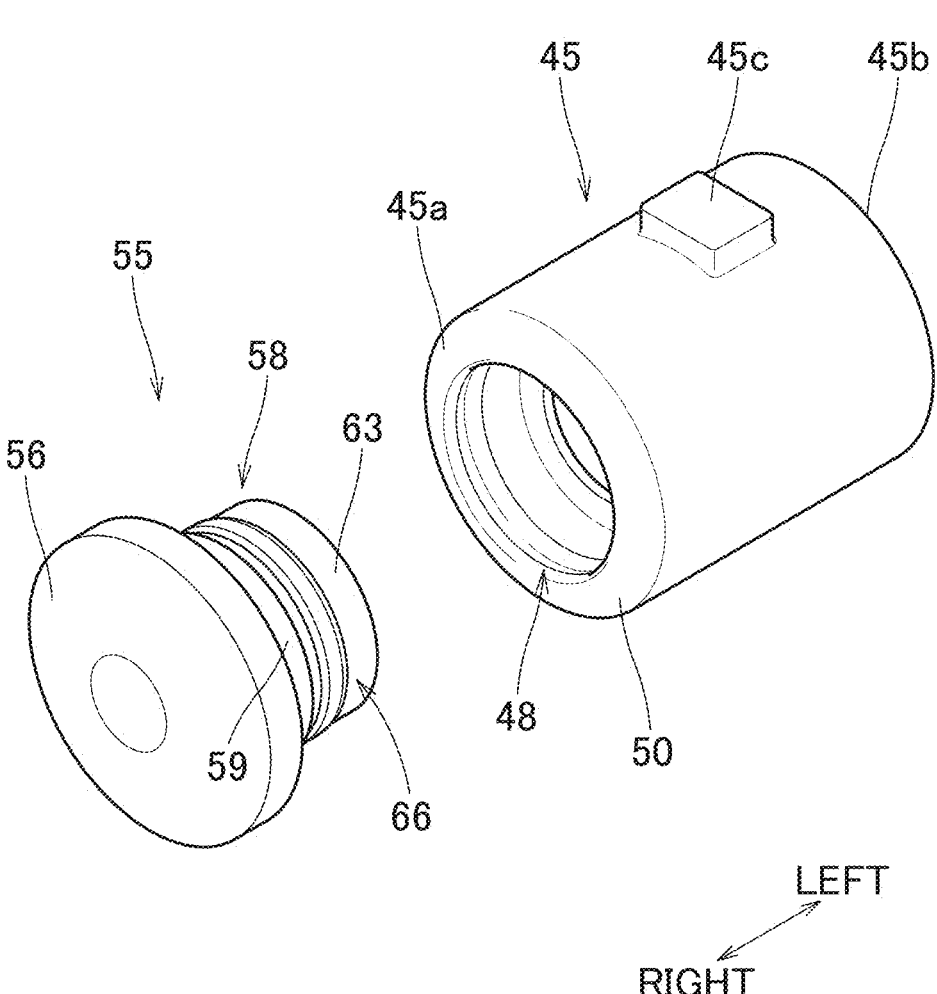
FIG. 7 is a schematic exploded perspective view illustrating the cap part and the holding part in the actuator of the embodiment.
Figures 10A, 10B:
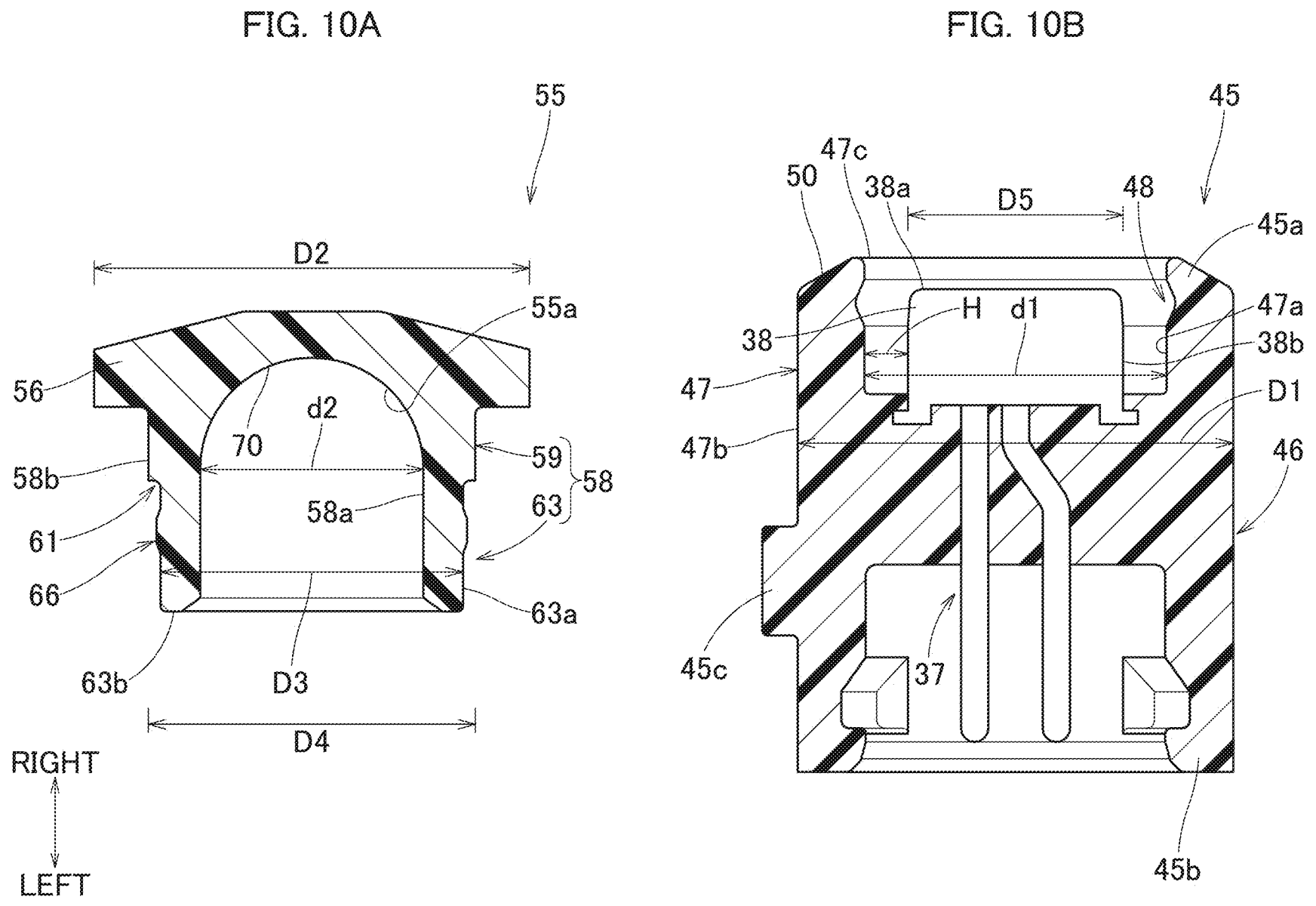
Figure 11:
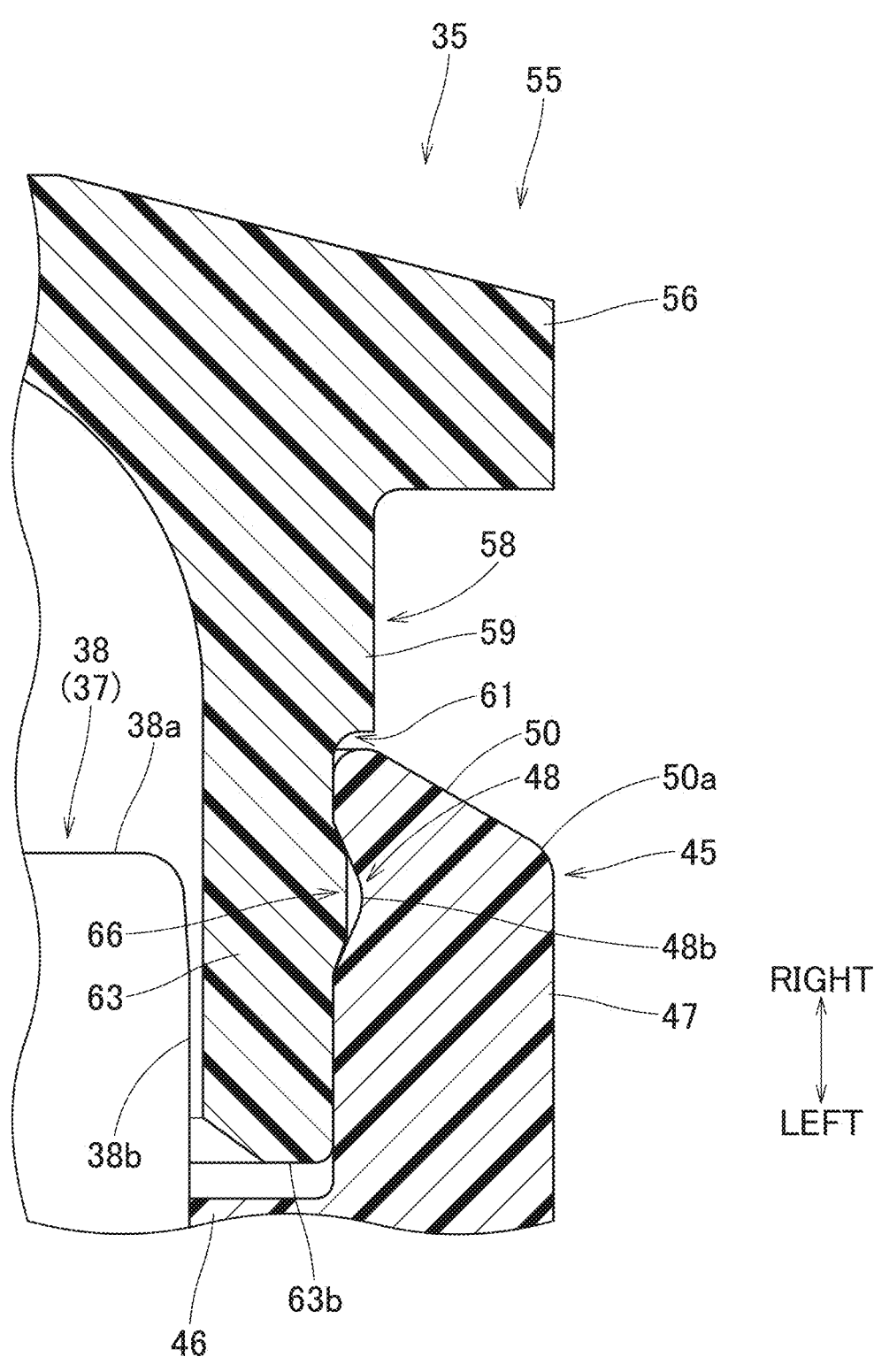
FIG. 11 is a partially enlarged longitudinal sectional view illustrating portions of a locking projection and a locking recess part in the actuator of the embodiment.
Figure 12:
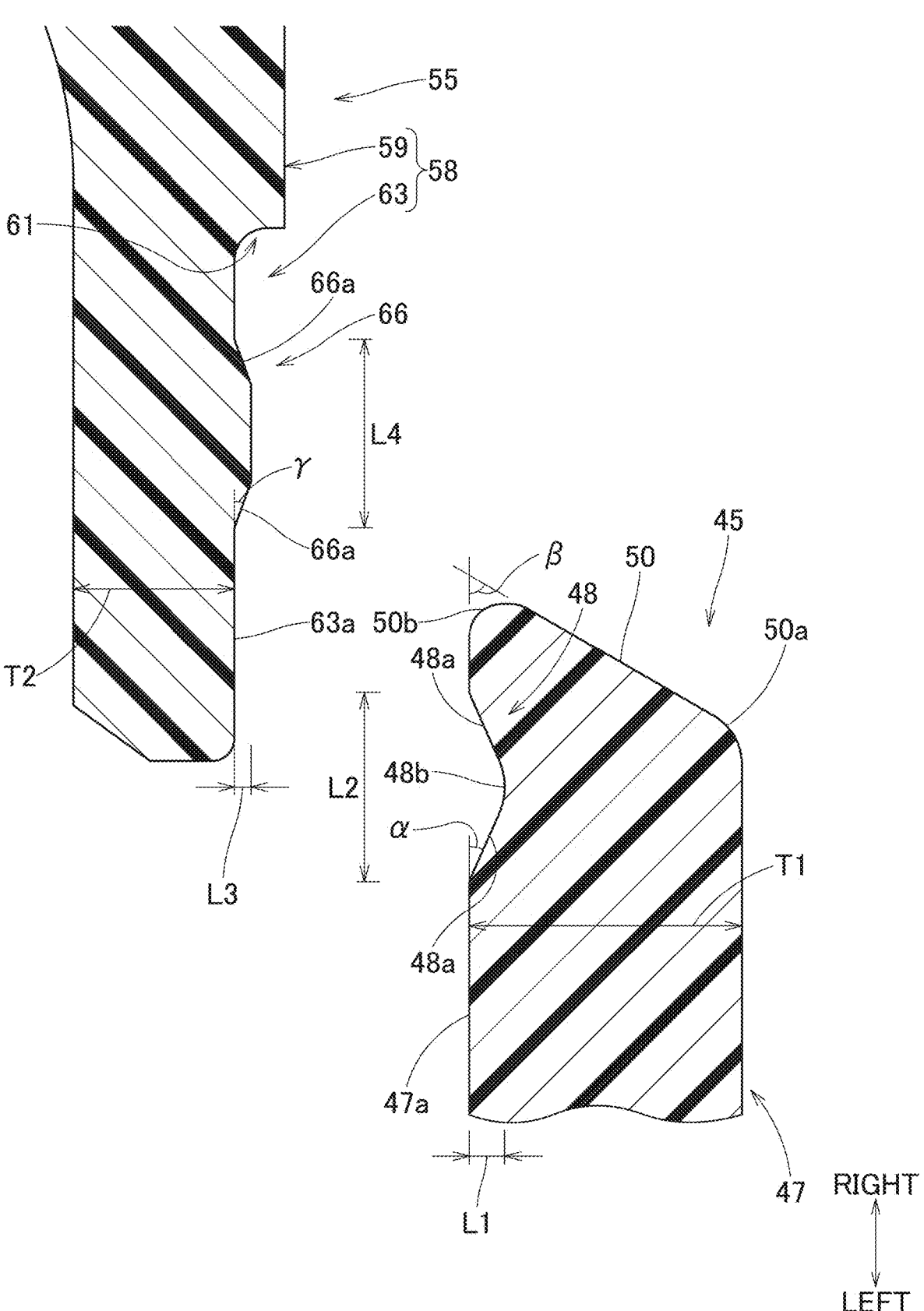
FIG. 12 is a partially enlarged sectional view illustrating portions of the locking projection provided in the cap part and the locking recess part provided in the holding part in the actuator of the embodiment.

As illustrated in FIGS. 8 and 10B, the holding part 45 includes the base 46 and a cylindrical part 47 extending from the base 46. The base 46 is a portion that is disposed on the proximal part side (left end 45b side) and holds the squib 37 (specifically, a region stretching from the left end surface side of the main body 38 to the proximal part side of the conductive pin 40). The cylindrical part 47 is designed to be capable of covering the side on at least the proximal part side of the squib 37 (specifically, the main body 38) over the entire circumference. A projection part 45c for positioning the attachment bracket 75 is formed on the outer peripheral surface side of the holding part 45. The projection part 45c protrudes in a substantially rectangular shape at a position slightly leftward from the center on the left and right of the holding part 45. As described above, the conductive pin 40 in the squib 37 protrudes the portion on the tip side thereof leftward from the left end surface side of the base 46. The cylindrical part 47 has a substantially cylindrical shape, and is configured such that a gap is provided with a side surface 38b of the main body 38, as illustrated in FIG. 10B. The tip side (right end side) of the cylindrical part 47 is opened. In the embodiment, the tip (right end 47c) of cylindrical part 47 is located slightly in front of the right end surface 38a of the main body 38 of the squib 37. That is, the cylindrical part 47 covers the side of the main body 38 over the entire circumference. On an inner peripheral surface 47a side of the cylindrical part 47, a locking recess part 48 for locking a locking projection 66 formed on the peripheral wall part 58 to be described later of the cap part 55 is formed. The locking recess part 48 is formed to recess the inner peripheral surface 47a in the vicinity of the tip (right end 47c) of the cylindrical part 47. In the embodiment, the locking recess part 48 is disposed to be continuously recessed over the entire circumference of the cylindrical part 47, as illustrated in FIGS. 7 and 10B. In more detail, the locking recess part 48 is formed to recess the inner peripheral surface 47a of the cylindrical part 47 into a roughly "U"-shaped cross section (tip 48b of the recess located outermost is arranged near the center on the left and right) such that two inclined surfaces 48a and 48a are arranged side by side on the left and right, as illustrated in FIG. 12. A recess amount L1 of the locking recess part 48 is set to about ⅛ of a thickness dimension T1 of the cylindrical part 47 (see FIG. 12). A width dimension L2 of the locking recess part 48 is set to about 6 times the recess amount L1 and to about ⅔ of the thickness dimension T1 of the cylindrical part 47 (see FIG. 12). An inclination angle α (see FIG. 12) of the inclined surface 48a with respect to the inner peripheral surface 47a of the cylindrical part 47 is set to about 20°. In the embodiment, a tip surface 50 formed on the tip (right end 47c) side of the cylindrical part 47 is inclined with respect to the axial direction of the holding part 45 (coincident with the inner peripheral surface 47a) such that the inner peripheral surface 47a side is located on the rightmost side in a cross section substantially along the front-rear direction. In detail, an inclination angle β (see FIG. 12) of the tip surface 50 with respect to the axial direction (inner peripheral surface 47a) is set to about 60°. In the embodiment, an outer edge 50a on an outer peripheral surface 47b side is arranged, in the tip surface 50, at a position slightly rightward from the tip 48b of the recess in the locking recess part 48 (see FIG. 12). The outer edge 50a is arranged at a position substantially coincident, on the left and right, with the right end surface 38a of the main body 38 of the squib 37 (see FIG. 11). That is, the tip 48b of the recess of the locking recess part 48 is located slightly leftward from the right end surface 38a of the main body 38.

As illustrated in FIGS. 8 and 10A, the cap part 55 includes the ceiling part 56 arranged to face the squib 37, and the cylindrical peripheral wall part 58 extending from the peripheral edge of the ceiling part 56. The outer shape of the ceiling part 56 is designed to be substantially disk-shaped. In the embodiment, an outer diameter dimension D2 of the ceiling part 56 is set to be substantially the same as the outer diameter dimension of the holding part 45 (i.e., outer diameter dimension D1 of the cylindrical part 47) (see FIGS. 10A and 10B).

As illustrated in FIG. 10A, the outer shape of the peripheral wall part 58 is designed to be a substantially cylindrical shape whose left end side on the squib 37 side is opened. The peripheral wall part 58 includes the proximal part side portion 59 located on the ceiling part 56 side, and a tip side portion 63 arranged on the squib 37 side. The tip side portion 63 has an outer diameter dimension slightly smaller than that of the proximal part side portion 59. The peripheral wall part 58 is provided with a stepped part 61 on the outer peripheral surface 58b side with the inner peripheral surface 58a side as flat. In this manner, the tip side portion 63 is designed to have a diameter smaller than that of the proximal part side portion 59. That is, the proximal part side portion 59 is configured to be slightly thicker than the tip side portion 63. In the embodiment, the tip side portion 63 is configured to cover the inner peripheral side of the cylindrical part 47 of the holding part 45. An outer diameter dimension D3 of the tip side portion 63 is made substantially the same as an inner diameter dimension d1 of the cylindrical part 47. A thickness dimension T2 of the tip side portion 63 is made equivalent to an opening width dimension H of the gap between the cylindrical part 47 and the main body 38 of the squib 37. That is, the thickness dimension T2 of the tip side portion 63 is set to a dimension at which the tip side portion 63 can be inserted into the gap between the cylindrical part 47 and the main body 38 (see FIGS. 10A, 10B, and 12). The tip side portion 63, which is a region on the tip side of the peripheral wall part 58, is configured to cover, in a state where the cap part 55 is attached to the holding part 45, the side surface 38b of the main body 38 of the squib 37 with no gap (see FIG. 8). Note that, in FIGS. 8 and 11, a slight gap is illustrated between the side surface 38b of the main body 38 and the tip side portion 63, but this gap is fine in reality. In the present specification, "with no gap" includes a slight gap occurring due to an error during manufacturing between the side surface 38b of the main body 38 and the tip side portion 63. In the embodiment, when the cap part 55 is attached to the holding part 45 (when the locking projection 66 is locked to the locking recess part 48), the tip surface (left end surface 63b) of the tip side portion 63 is arranged in a state where a slight gap is provided between the tip surface (left end surface 63b) and the base 46 of the holding part 45 (see FIG. 11).

The locking projection 66 is formed on an outer peripheral surface 63a side of the tip side portion 63 of the peripheral wall part 58. The locking projection 66 is a portion that is locked by being inserted into the locking recess part 48 formed on the inner peripheral surface 47a side of the cylindrical part 47 of the holding part 45. The locking projection 66 is formed to protrude outward from the outer peripheral surface 63a at substantially the center on the left and right of the tip side portion 63. In the embodiment, the locking projection 66 is disposed to continuously protrude over the entire circumference of the tip side portion 63, as illustrated in FIG. 7. The locking projection 66 is designed such that the cross-sectional shape thereof in a direction side substantially along the left-right direction is a flat, substantially trapezoidal shape. A width dimension L4 of the locking projection 66 is set to be substantially the same as the width dimension L2 of the locking recess part 48 (see FIG. 12). A protrusion amount L3 of the locking projection 66 is set to about ½ of the recess amount L1 of the locking recess part 48 (see FIG. 12). The protrusion amount L3 of the locking projection 66 is also set to about ⅒ of the thickness dimension T2 of the tip side portion 63. The locking projection 66 is configured to dispose inclined surfaces 66a and 66a on the right end side and the left end side. The inclined surface 66a is disposed corresponding to the inclined surface 48a formed in the locking recess part 48. An inclination angle γ (see FIG. 12) of the inclined surface 66a with respect to the outer peripheral surface 63a of the tip side portion 63 is set to about 20°. The outer shape (the protrusion amount to the outside, the angle of the inclined surface 66a, the protrusion amount with respect to the thickness dimension T2 of the tip side portion 63, and the dimensional difference with respect to the recess amount L1 of the locking recess part 48) of the locking projection 66 is designed to suppress, when the locking to the locking recess part 48 is released at the time of the operation of the actuator main body 35, breakage of the tip side portion 63 or the cylindrical part 47 of the holding part 45 and to enable the tip side portion 63 to be detached from the cylindrical part 47 (the cap part 55 to be detached from the holding part 45).

Figure 9:
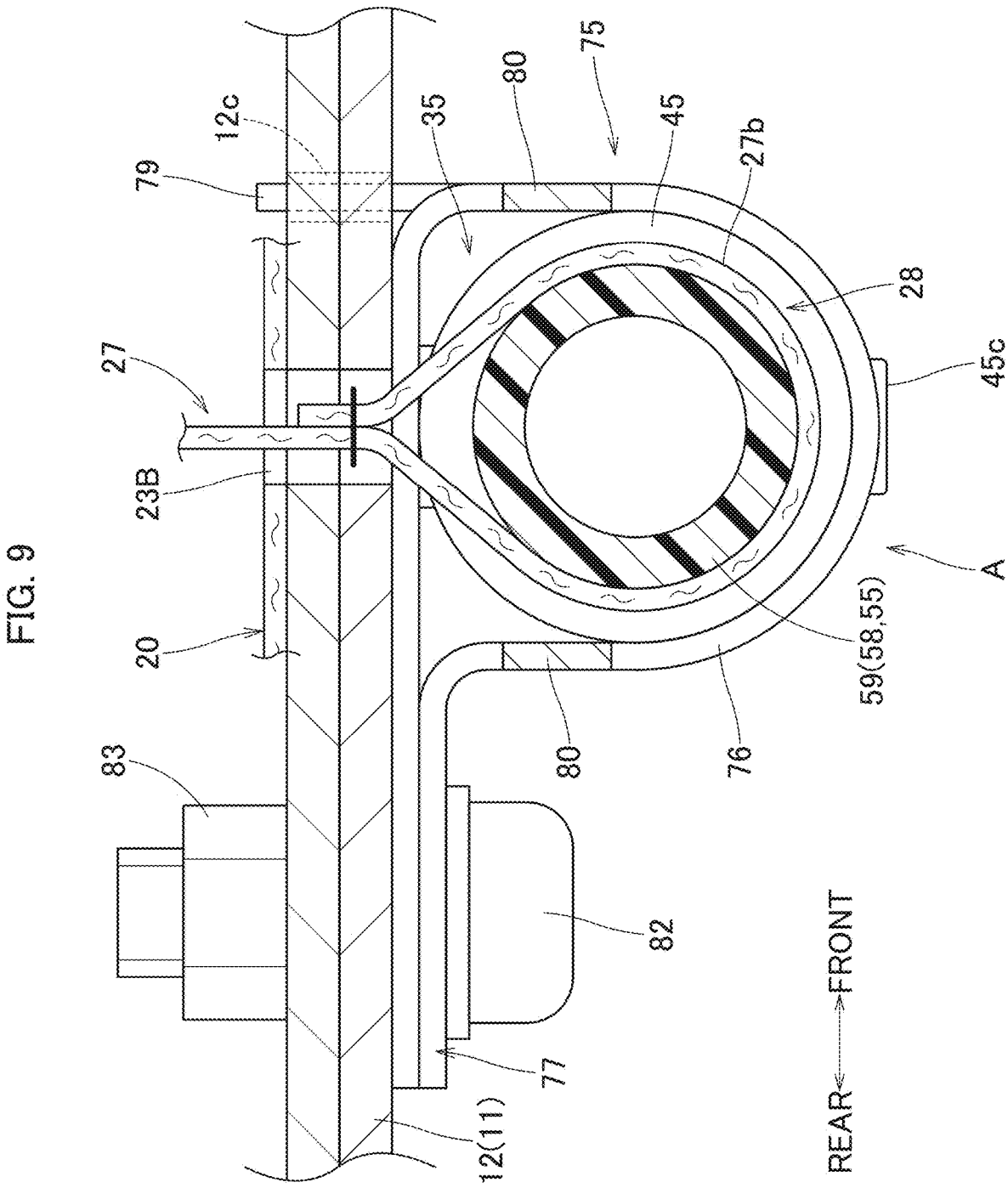
FIG. 9 is a longitudinal sectional view of the actuator in FIG. 8, taken along the front-rear direction, and is a view illustrating a portion of a proximal part side portion of a peripheral wall part of the cap part.

An outer diameter dimension D4 of the proximal part side portion 59 of the peripheral wall part 58 is set to about ⅘ of the outer diameter dimension D2 of the ceiling part 56 (see FIG. 10A). The proximal part side portion 59 is a portion arranged to be exposed between the holding part 45 and the ceiling part 56 in the state where the cap part 55 is attached to the holding part 45 (see FIG. 11). In the embodiment, the proximal part side portion 59 is inserted into the loop part 28 formed on the tip 27b side of the coupling string part 27 (coupling means) in the airbag 20, as illustrated in FIGS. 8 and 9.

In the embodiment, the cap part 55 is formed by curving an inner peripheral surface 55a side, stretching from the peripheral wall part 58 to the ceiling part 56, into a hemispherical shape. In detail, in the embodiment, the cap part 55 has a curved surface part 70, curved into a hemispherical shape, disposed on the inner peripheral surface 55a side stretching from the proximal part side portion 59 to the ceiling part 56 (see FIG. 10A). In the embodiment, an inner diameter dimension d2 of the curved surface part 70 is set to be substantially the same as an outer diameter dimension D5 of the main body 38 of the squib 37 (see FIGS. 10A and 10B). In the curved surface part 70, a separation distance L5 (see FIG. 8) between the central side of the curved surface part 70 and the main body 38 in the state where the cap part 55 is attached to the holding part 45 is set to be slightly larger than the radial dimension (i.e., ½ of the outer diameter dimension D5) of the main body 38.

The attachment bracket 75 is made of sheet metal. As illustrated in FIGS. 5, 6A, and 6B, the attachment bracket 75 includes a main body 76 that is wound around the outer peripheral side of the holding part 45 over substantially the entire circumference, and attachment parts 77 arranged on both end sides of the main body 76. The attachment parts 77 are each a portion that is bolted, as a two-ply form, to the bottom wall part 12 of the case 11. An insertion hole 77a, which enables the bolt 82 to be inserted, is formed in each of the attachment parts 77. In the main body 76, a through hole 78, through which the projection part 45c formed on the holding part 45 can pass, is formed in a region covering the lower surface side of the holding part 45. The through hole 78 is opened in a substantially rectangular shape. The protruding piece 79 is formed in a region that is on a right edge 76b side and on the front end side of the main body 76. The protruding piece 79 protrudes in the upward direction that is on the bottom wall part 12 side of the case 11. The protruding piece 79 is inserted into the through hole 12c formed in the bottom wall part 12. The protruding piece 79 is provided for positioning when the actuator main body 35 is attached to the bottom wall part 12 using the attachment bracket 75. Furthermore, two restriction pieces 80 and 80 are formed on both front and rear end sides on a right edge 76a side of the main body 76 so as to extend rightward (see FIG. 5). The restriction pieces 80 are disposed up to the vicinity of the ceiling part 56 so as to cover the front and rear sides of the proximal part side portion 59 of the cap part 55 (see FIGS. 5 and 9). The restriction pieces 80 and 80 are disposed to prevent the tip 27b side (loop part 28) of the coupling string part 27 from coming off the actuator main body 35 in a state of being mounted on the vehicle.

Next, mounting of the actuator A and the airbag device M of the embodiment on a vehicle will be described. First, the airbag 20 is folded to be able to be housed in the case 11 in a state where the retainer 7 is arranged inside. At this time, the state where the coupling string part 27 is inserted into the insertion holes 23A and 23B to protrude the tip 27b side from the insertion hole 23B is maintained, and the flap 26 maintains the state where the exhaust hole 24 is closed. Thereafter, the folded airbag 20 is housed in the case 11. At this time, the tip 27b of the coupling string part 27 is protruded from the insertion hole 12a of the bottom wall part 12. The proximal part side portion 59 of the cap part 55 of the actuator main body 35 is inserted into the loop part 28 formed at the tip 27b of the coupling string part 27. Next, the cap part 55 in the state of penetrating the tip 27b (loop part 28) of the coupling string part 27 is attached to the holding part 45 in the state where the attachment bracket 75 is attached, thereby forming the actuator main body 35. When the attachment part 77 of the attachment bracket 75 is attached to the bottom wall part 12 using the bolt 82 and a nut 83, the actuator main body 35 can be coupled to the coupling string part 27 (coupling member). At the same time, the actuator A can be attached to the case 11. Next, the main body 9a of the inflator 9 is inserted from below. The inflator 9 and the airbag 20 are attached to the case 11 using the bolts 7a of the retainer 7, protruding from the bottom wall part 12, and the nuts 8. Furthermore, the airbag cover 15 is placed over the case 11, and the airbag cover 15 is attached to the case 11 using the rivet 16 or the like. Thereafter, when a horn switch mechanism (not illustrated) is assembled to an attachment piece (not illustrated) of the case 11, the airbag device M can be assembled. The airbag device M can be attached to the steering wheel main body 1 fastened to the steering shaft SS in advance using an attachment board (not illustrated) of the horn switch mechanism. Thereafter, a connector (not illustrated), to which a lead wire extending from the control device 90 is connected, is connected to the squib 37 of the actuator main body 35. When a lead wire (not illustrated) extending from the control device 90 is also connected to the inflator 9, the airbag device M and the actuator A can be mounted on the vehicle.

Figure 13B:
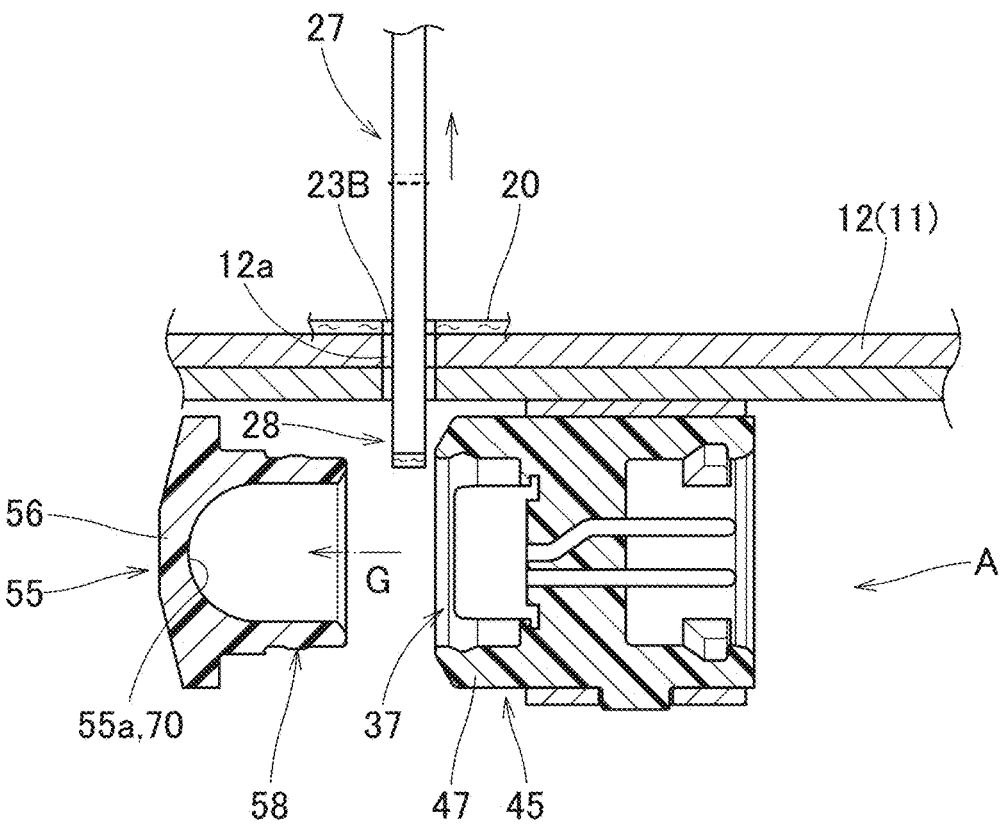

In the airbag device M of the embodiment, when the inflation gas is discharged from the gas outlets 9b of the inflator 9, the airbag 20 inflates by allowing the inflation gas to flow inside. The airbag 20 completes its inflation in a way in which the airbag protrudes from the case 11 while pushing and opening the door parts 15b and 15b of the airbag cover 15 and covers substantially the entire upper surface of the steering wheel W as indicated by the chain double-dashed line in FIG. 1. At this time, in the actuator main body 35 of the actuator A, when the squib 37 operates by receiving an operation signal from the control device 90, a combustion gas G generated by the operation of the squib 37 is ejected toward the cap part 55 while breaking and opening the cover 39 covering the outer peripheral side of the main body 38. Then, the combustion gas G presses the ceiling part 56 of the cap part 55. The cap part 55 receives the pressure of the combustion gas G by the ceiling part 56, which detaches the peripheral wall part 58 from the cylindrical part 47 while the locked state of the locking projection 66 to the locking recess part 48 is being released, thereby the cap part 55 coming off the holding part 45. As illustrated in FIG. 13B, the cap part 55 comes off the loop part 28 provided on the tip 27b side of the coupling string part 27, and the coupled state to the coupling string part 27 is released. Then, the flap 26 coupled to the coupling string part 27 opens the exhaust hole 24 of the airbag 20 as illustrated in FIG. 4C, and the inflation gas is exhausted from the exhaust hole 24.

In the actuator A of the embodiment, the cap part 55 is attached to the holding part 45 in a way in which the cylindrical peripheral wall part 58 extending from the peripheral edge of the ceiling part 56 is arranged on the inner peripheral side or the outer peripheral side (in the embodiment, the inner peripheral side) of the cylindrical part 47 covering the side on at least the proximal part side of the squib 37 (specifically, the main body 38 of the squib 37) over the entire circumference in the holding part 45. That is, in the actuator A of the embodiment, the periphery of the squib 37 is covered with the ceiling part 56 and the peripheral wall part 58 with substantially no gap in the state where the cap part 55 is attached to the holding part 45. Therefore, airtightness is good, and when the squib 37 operates, the ceiling part 56 can be quickly pressed by the combustion gas G generated. As a result, the coupling to the coupling string part 27 as the coupling means extending from the airbag 20 can be quickly released.

Therefore, in the actuator A of the embodiment, good airtightness can be secured, and at the time of operation, the coupling to the coupling string part 27 extending from the airbag 20 can be quickly released.

In addition, in the actuator A of the embodiment, when receiving the pressure of the combustion gas G by the ceiling part 56, the cap part 55 is configured to move the ceiling part 56 while detaching the peripheral wall part 58 from the cylindrical part 47. That is, in the actuator A of the embodiment, the cap part 55 is configured to come off the holding part 45 without the peripheral wall part 58 damaged. Therefore, as compared with a cap part of the conventional actuator configured to extend two leg parts from a ceiling part, the cap part 55 does not include a portion that locally protrudes largely, and damage, possibly occurring when the cap part 55 comes off the holding part 45 and is scattered, can be suppressed.

Furthermore, in the actuator A of the embodiment, the peripheral wall part 58 of the cap part 55 is arranged on the inner peripheral side of the cylindrical part 47 of the holding part 45. The peripheral wall part 58 is configured such that the region on the tip side (tip side portion 63) covers the side surface 38b of the squib 37 (main body 38) with no gap. Therefore, the combustion gas G generated when the squib 37 (main body 38) operates can be quickly headed toward the ceiling part 56 without heading to the side of the main body 38. In addition, as compared with the case of a configuration in which the peripheral wall part is arranged on the outer peripheral side of the cylindrical part, the size of the cap part 55 (specifically, the size of the peripheral wall part 58) can be made more compact. That is, an increase in the weight of the cap part can be suppressed, and thus damage, possibly occurring after the cap part is scattered, can be further suppressed also from this point of view. Note that, if such a point is not taken into consideration, a cap part having a configuration in which the peripheral wall part is disposed on the outer peripheral side of the cylindrical part of the holding part may be used. Also, in the case of a configuration in which the peripheral wall part is disposed on the inner peripheral side of the cylindrical part of the holding part, a configuration in which the region on the tip side of the peripheral wall part does not cover the side surface of the squib may be adopted.

Furthermore, in the actuator A of the embodiment, the cap part 55 curves the inner peripheral surface 55a side, stretching from the peripheral wall part 58 (specifically, the proximal part side portion 59 on the ceiling part 56 side) to the ceiling part 56, into a hemispherical shape. Therefore, when the ceiling part 56 is pressed by the combustion gas G at the time of the operation of the squib 37, the pressure can be substantially equally applied to the hemispherically curved region (curved surface part 70).

In the actuator A of the embodiment, a configuration is adopted in which, when the actuator A operates, the cover 39, covering the outer peripheral side of the gas generating agent (not illustrated) in the squib 37, breaks the region of the disk-shaped top plate part 39a covering the cap part 55 side with the vicinity of the center as a starting point and divides the region into a plurality of parts, leaving the region radially opened. However, the inner peripheral surface 55a side (curved surface part 70) of the cap part 55 is curved into a hemispherical shape, and does not include a portion that partially protrudes into a region that hits the trajectory of the cover 39 (top plate part 39a) when it is opened. Therefore, the cover 39 (top plate part 39a) can be prevented from hitting the region on the inner peripheral surface side of the cap part 55 in the middle of the opening, and the cover 39 (top plate part 39a) can be quickly opened. In the actuator A of the embodiment, the inner diameter dimension d2 of the curved surface part 70 is particularly set to be substantially the same as the outer diameter dimension D5 of the main body 38 of the squib 37. In addition, the separation distance L5 between the central side of the curved surface part 70 and the main body 38 in the state where the cap part 55 is attached to the holding part 45 is set to be slightly larger than the radial dimension (½ of the outer diameter dimension D5) of the main body 38. That is, in the actuator A of the embodiment, it can be accurately suppressed that, when the actuator A operates and when, in the cover 39, the disk-shaped top plate part 39*a* arranged to face the ceiling part 56 is radially opened by being broken with the vicinity of the center as a starting point and by being divided into a plurality of parts, the top plate part 39*a* hits the inner peripheral surface 55*a* side of the cap part 55 until the opening is substantially completed (see the chain double-dashed line in FIG. 8). The volume of a space (a space once filled with the combustion gas G at the time of operation) in the region surrounded by the main body 38 of the squib 37 and the cap part 55 is set to the minimum required. There-fore, the pressing force of the combustion gas G generated when the squib 37 operates can be efficiently applied to the cap part 55 while occurrence of loss is suppressed as much as possible.

In the actuator A of the embodiment, both the locking recess part 48 formed on the inner peripheral surface 47*a* side of the cylindrical part 47 of the holding part 45 and the locking projection 66 formed on the outer peripheral surface 63*a* side of the peripheral wall part 58 (the tip side portion 63) of the cap part 55 are formed on the cylindrical part 47 or the tip side portion 63 over the entire circumference. Therefore, it is not necessary to consider the orientation and the like when the cap part 55 is attached to the holding part 45, making attachment workability good. In addition, as compared with the case where the locking projection and the locking recess part are partially provided, the protrusion amount of the locking projection 66 (the recess amount of the locking recess part 48) can also be set to be relatively smaller. In the actuator A of the embodiment, the locking projection 66 is particularly configured to dispose the inclined surfaces 66*a* on both end sides (left end side and right end side) on the direction side in which the peripheral wall part 58 (tip side portion 63) is inserted into the cylindrical part 47. The inclination angle γ of the inclined surface 66*a* with respect to the outer peripheral surface 63*a* is set to be small. In other words, the locking projection 66 is formed to gently rise on the direction side along the direction in which the tip side portion 63 is inserted into the cylindrical part 47. Also on the locking recess part 48, the inclined surfaces 48*a* corresponding to the inclined surfaces 66*a* of the locking projection 66 are formed. Therefore, when the ceiling part 56 is moved to be pushed toward the holding part 45 at the time of attachment of the cap part 55 to the holding part 45, the locking projection 66 can be inserted into the locking recess part 48 with a relatively light force and locked to the peripheral edge of the locking recess part 48. Even when the cap part 55 is moved due to the pressing of the ceiling part 56 by the combustion gas G at the time of operation of the squib 37, the locking projection 66 can be smoothly caused to come off the locking recess part 48, suppressing damage of the peripheral edge portions of the locking projection 66 and the locking recess part 48. The inclination of the tip surface 50 provided on the right end 47*c* side of the cylindrical part 47 of the holding part 45 is also formed in consideration of such attachment workability and detachment of the cap part 55 when the squib 37 operates.

Note that, unless the above-described points are taken into consideration, the locking projection and the locking recess part need not be formed over the entire circumference. The locking projection and the locking recess part may be disposed, for example, at a plurality of radial locations. Contrary to the embodiment, the locking projection may be provided on the holding part side, and the locking recess part may be provided on the cap part side. From the viewpoint of suppressing damage after scattering, however, it is better that the locking projection be disposed on the cap part side than that the locking recess part, where a partially thin-walled region is to be formed, be disposed.

In the embodiment, the coupling string part 27 formed of narrow, flexible strips is used as the coupling means extend-ing from the airbag 20. The loop part 28 as the insertion hole is disposed on the tip 27*b* side of the coupling string part 27. In the embodiment, the outer shape (inner diameter dimen-sion) of the loop part 28 is set to a dimension that enables the proximal part side portion 59 of the cap part 55 to be inserted and disables the ceiling part 56 of the cap part 55 to be inserted. The outer shape (inner diameter dimension) of the loop part is not limited to the embodiment. The outer shape (inner diameter dimension) of the loop part may be set to a dimension that enables both the proximal part side portion and the ceiling part of the cap part to be inserted. In the actuator A of the embodiment, the attachment bracket 75 to which the actuator main body 35 is attached includes the restriction pieces 80 and 80 covering the front and rear sides (both sides) of the proximal part side portion 59 of the cap part 55. Therefore, even if the outer shape (inner diameter dimension) of the loop part 28 is set to be large as described above, the loop part 28 can be accurately prevented from coming off the actuator main body 35. Of course, the coupling means need not be a string-like body as in the embodiment. As the coupling means, a means, formed of flexible strips and having an insertion hole opened on the tip side, may be used.

In the embodiment, description has been made by taking the airbag device for a steering wheel as an example of the airbag device using an actuator. However, the air bag device that can use the actuator of the present invention is not limited to ones for a steering wheel. The actuator of the present invention may be used in an airbag device for a passenger seat. In the embodiment, the internal pressure of the airbag is controlled by the actuator. However, the control of the inflated state of the airbag is not limited to the internal pressure control. For example, the actuator of the present invention may be used to control the fully inflated shape of the airbag.

The present disclosure relates to an actuator for an airbag device having the following configuration.

An actuator for an airbag device that is attached to a side of a housing portion housing a folded airbag, the actuator having a configuration in which an inflated state of the airbag can be controlled by coupling a coupling means extending from the airbag and by maintaining or releasing a coupled state to the coupling means, and the actuator including: a squib; a holding part that holds the squib on one end side; and a cap part that is disposed on the other end side of the holding part so as to face the squib, wherein the holding part includes a cylindrical part capable of covering a side on at least a proximal part side of the squib over an entire circumference, the cap part includes a ceiling part arranged to face the squib, and a peripheral wall part having a cylindrical shape extend-ing from a peripheral edge of the ceiling part and arranged to cover an inner peripheral side or an outer peripheral side of the cylindrical part, is configured to close the other end side of the holding part, and is configured to be attached to the holding part by locking the peripheral wall part to the cylindrical part, and when attached to the holding part, an inserted state where the cylindrical part or the peripheral wall part is inserted into an insertion hole formed on a tip side of the coupling means can be maintained, and when the ceiling part receives a pressure of a combustion gas generated when the squib operates, coupling to the coupling means can be released by moving the ceiling part while detaching the peripheral wall part from the cylindrical part.

In the actuator for an airbag device of the present disclosure, the cap part is attached to the holding part in a way in which the cylindrical peripheral wall part extending from the peripheral edge of the ceiling part is arranged on the inner peripheral side or the outer peripheral side of the cylindrical part covering the side on at least the proximal part side of the squib over the entire circumference in the holding part. That is, in the actuator for an airbag device according to the present invention, the periphery of the squib is covered with the ceiling part and the peripheral wall part or the cylindrical part of the holding part with substantially no gap in the state where the cap part is attached to the holding part. Therefore, airtightness is good, and when the squib operates, the ceiling part can be quickly pressed by the combustion gas generated, whereby the coupling to the coupling means extending from the airbag can be quickly released.

Therefore, in the actuator for an airbag device of the present disclosure, good airtightness can be secured, and at the time of operation, the coupling to the coupling member extending from the airbag can be quickly released.

In addition, in the actuator for an airbag device of the present disclosure, the cap part is configured to move the ceiling part while detaching the peripheral wall part from the cylindrical part when the pressure of the combustion gas is received by the ceiling part. That is, in the actuator for an airbag device of the present disclosure, the cap part is configured to come off the holding part without the peripheral wall part damaged. Therefore, as compared with a cap part of the conventional actuator configured to extend two leg parts from a ceiling part, the cap part does not include a portion that locally protrudes largely, and damage, possibly occurring when the cap part comes off the holding part and is scattered, can be suppressed.

Furthermore, in the actuator for an airbag device of the present disclosure, it is preferable that the peripheral wall part be arranged on the inner peripheral side of the cylindrical part and the region on the tip side cover the side surface of the squib with no gap. This is because the side surface of the squib is covered with the peripheral wall part extending from the ceiling part with no gap, so that the combustion gas, generated when the squib operates, can be quickly headed toward the ceiling part without heading to the side of the squib.

Furthermore, in the actuator for an airbag device having the above configuration, the cap part is preferably formed by curving the inner peripheral surface side, stretching from the peripheral wall part to the ceiling part, into a hemispherical shape. This is because when the ceiling part is pressed by the combustion gas, the pressure can be substantially equally applied to the hemispherically curved region.

What is claimed is:

1. An actuator for an airbag device that is attached to a side of a housing portion housing an airbag which is folded, the actuator having a configuration in which an inflated state of the airbag can be controlled by coupling a coupling means extending from the airbag and by maintaining or releasing a coupled state to the coupling means, and the actuator comprising: a squib; a holding part that holds the squib on one end side; and a cap part that is disposed on an other end side of the holding part so as to face the squib, wherein the holding part includes a cylindrical part capable of covering a side on at least a proximal part side of the squib over an entire circumference, the cap part includes a ceiling part arranged to face the squib, and a peripheral wall part having a cylindrical shape extending from a peripheral edge of the ceiling part and arranged to cover an inner peripheral side or an outer peripheral side of the cylindrical part, is configured to close the other end side of the holding part, wherein the peripheral wall part is arranged on the inner peripheral side of the cylindrical part, and is configured to be attached to the holding part by locking the peripheral wall part to the cylindrical part, and when attached to the holding part, an inserted state where the cylindrical part or the peripheral wall part is inserted into an insertion hole formed on a tip side of the coupling means can be maintained, and when the ceiling part receives a pressure of a combustion gas generated when the squib operates, coupling to the coupling means can be released by moving the ceiling part while detaching the peripheral wall part from the cylindrical part, wherein a locking recess part or a locking projection that can be locked to each other is formed on an inner peripheral surface side of the cylindrical part or an outer peripheral surface side of the peripheral wall part, respectively, both the locking recess part and the locking projection are formed over an entire circumference of the cylindrical part or the peripheral wall part, the locking projection includes inclined surfaces on both end sides in a direction in which the peripheral wall part is inserted into the cylindrical part, the locking recess part includes inclined surfaces formed to correspond to the inclined surfaces of the locking projection, the locking projection is provided on the outer peripheral surface side of the peripheral wall part, the locking recess part is provided on the inner peripheral surface side of the cylindrical part, a cross-sectional of the locking projection in a direction in which the peripheral wall part is inserted into the cylindrical part has a flat, substantially trapezoidal shape, a width dimension of the locking projection along the direction in which the peripheral wall part is inserted into the cylindrical part and the width dimension of the locking recess part are substantially same, and a protrusion amount by which the locking projection protrudes is smaller than a recess amount by which the locking recess part recedes.

2. The actuator for the airbag device according to claim 1, wherein the cap part is formed by curving an inner peripheral surface side, stretching from the peripheral wall part to the ceiling part, into a hemispherical shape.

3. The actuator for the airbag device according to claim 1, wherein an inclination angle of the inclined surfaces with respect to the outer peripheral surface side of the peripheral wall part in the direction in which the peripheral wall part is inserted into the cylindrical part is about 20 degrees.

4. An actuator for an airbag device that is attached to a side of a housing portion housing an airbag which is folded, the actuator having a configuration in which an inflated state of the airbag can be controlled by coupling a coupling means extending from the airbag and by maintaining or releasing a coupled state to the coupling means, and the actuator comprising: a squib; a holding part that holds the squib on one end side; and a cap part that is disposed on an other end side of the holding part so as to face the squib, wherein the holding part includes a cylindrical part capable of covering a side on at least a proximal part side of the squib over an entire circumference, the cap part includes a ceiling part arranged to face the squib, and a peripheral wall part having a cylindrical shape extending from a peripheral edge of the ceiling part and arranged to cover an inner peripheral side or an outer peripheral side of the cylindrical part, is configured to close the other end side of the holding part, and is configured to be attached to the holding part by locking the peripheral wall part to the cylindrical part, and when attached to the holding part, an inserted state where the cylindrical part or the peripheral wall part is inserted into an insertion hole formed on a tip side of the coupling means can be maintained, and when the ceiling part receives a pressure of a combustion gas generated when the squib operates, coupling to the coupling means can be released by moving the ceiling part while detaching the peripheral wall part from the cylindrical part, wherein the cap part is formed by curving an inner peripheral surface side, stretching from the peripheral wall part to the ceiling part, into a hemispherical shape, there is a gap between the squib and the cap part, and a separation distance between a radial center of the inner peripheral surface side and a cover of the squib in a state in which the cap part is attached to the holding part and the cover faces the inner peripheral surface side is greater than or equal to a radial dimension of the cover.

5. The actuator for the airbag device according to claim 4, wherein the peripheral wall part is arranged on the inner peripheral surface side of the cylindrical part, and is configured such that a region on a tip side portion of the peripheral wall part covers a side surface of the squib with no gap.

\* \* \* \* \*